Oct. 22, 1968  A. STEIGER  3,406,666
METHOD AND APPARATUS FOR OPERATING A DIESEL ENGINE WITH
A COMBINATION OF LIQUID AND GASEOUS FUELS
Filed Feb. 1, 1966
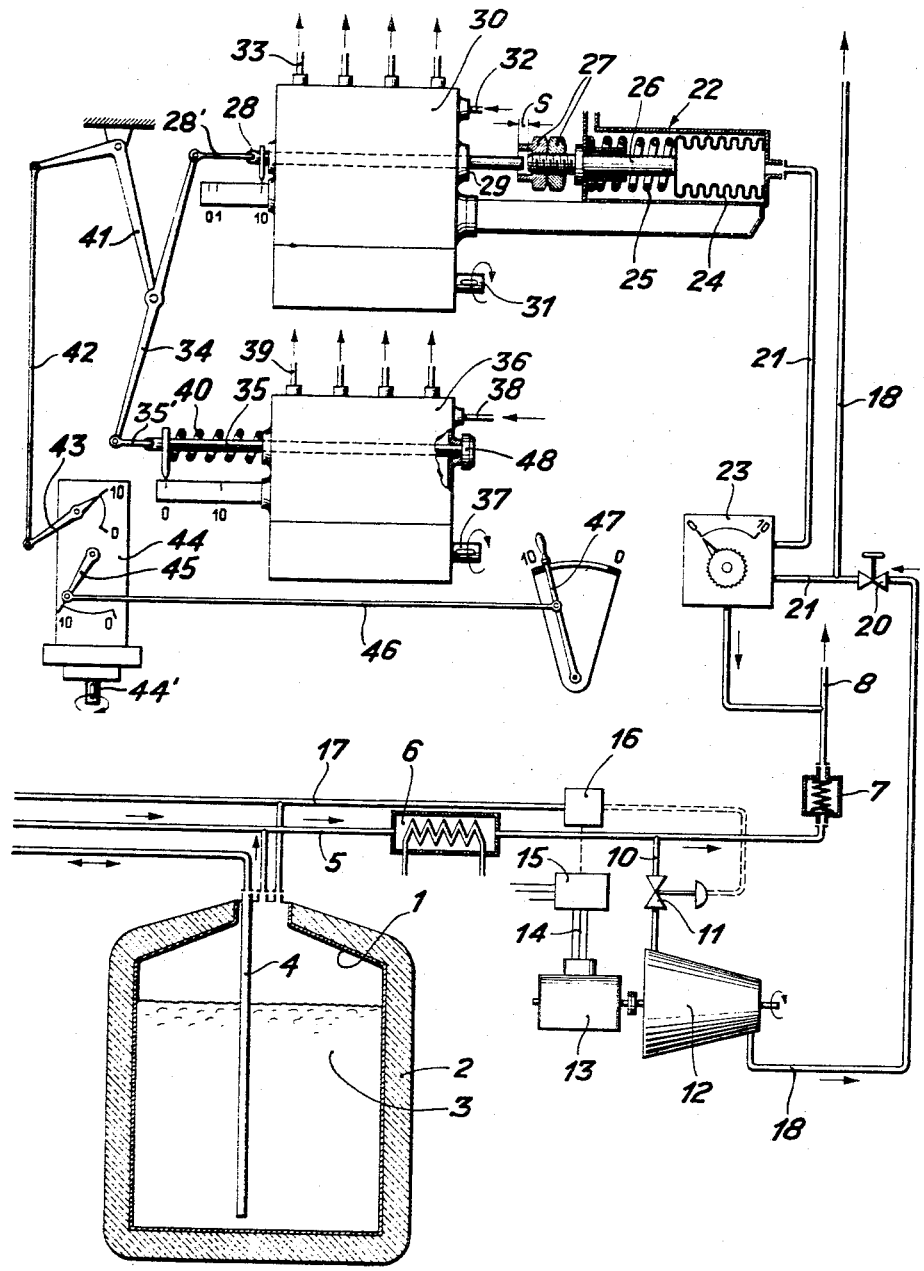
Inventor:
Anton Steiger
BY
ATTORNEYS United States Patent Office 3,406,666
Patented Oct. 22, 1968

3,406,666
METHOD AND APPARATUS FOR OPERATING A DIESEL ENGINE WITH A COMBINATION OF LIQUID AND GASEOUS FUELS
Anton Steiger, Zurich, Switzerland, assignor to Sulzer Brothers Limited, Winterthur, Switzerland, a Swiss company
Filed Feb. 1, 1966, Ser. No. 524,164
Claims priority, application Switzerland, Feb. 2, 1965, 1,418/65
1 Claim. (Cl. 123—27)

ABSTRACT OF THE DISCLOSURE

There is disclosed a power plant, and a method of operating the same, in which a vaporizable liquid is stored at low temperature in an insulated vessel. The vaporized gas is withdrawn at the rate necessary to maintain constant pressure in the vessel and the gas so withdrawn is compressed and delivered to an internal combustion engine under control of a gaseous fuel metering device. There is also provided a liquid fuel metering device for control of the supply of a liquid fuel to the engine simultaneously with the gaseous fuel, and the two metering devices are differentially coupled together and to an engine speed governor. A spring biases the gaseous and liquid fuel metering devices toward minimum and maximum settings respectively. A pressure-responsive device establishes for the liquid fuel metering device a maximum permissible setting which varies inversely with the pressure of the compressed gas or of a fraction thereof selected in a pressure-reducing device.

---

The present invention pertains to a method of operating a power plant including a diesel engine which is fueled in part with liquid fuel and in part with gaseous fuel produced by the evaporation of liquefied gas stored in a container, the evaporation being due to absorption of ambient heat by the liquefied gas. The method of the invention is characterized by the fact that the gas so evolved by evaporation is delivered to the engine at the rate of its evolution, and by the fact that simultaneously the additional fuel required for the desired power output from the engine is supplied by feeding to the engine a corresponding quantity of liquid fuel.

In the power plant of the invention, a compressor is provided in a gas conduit between the container for liquefied gas and the engine, and a pressure controlling device is provided in this conduit between the container and the compressor. This control device maintains upstream of the compressor a pressure corresponding to the rate of evolution of gas, and in the event of insufficient gas evolution it interrupts the withdrawal of gas from the container.

Methane tanker ships transport natural gas which has been liquefied through cooling down to approximately −161° C., the gas being transported in insulated containers of rectangular cross-section. These containers can withstand only slight amounts of excess pressure or vacuum, i.e., slight departures from atmospheric pressure in the interior thereof. The containers are provided with safety valves in order to prevent the development of dangerous excess pressures as a result of the unavoidable natural vaporization of the liquefied natural gas contained therein. Upon a dangerous rise in pressure, these valves permit escape to the atmosphere of part of the gas evolved.

Various arrangements have been proposed to deliver this vaporized gas to the diesel propulsion system of the vessel. Prior art devices of this kind have, however, been subject to a number of disadvantages. For example, it has been necessary after combustion or consumption of the available vaporized gas to effect a sudden switching of the engine or engines from gas firing to diesel oil firing. Additionally, energy losses have been incurred in the compressor required for compression of the gas before introduction into the engines, and there have also been difficulties in controlling the supply of the gas to the engines.

In accordance with the present invention, there is provided a method of operating such a diesel power plant which, under normal circumstances, involves either no switchovers from gas firing to oil firing, or a minimum of such switchovers. The method and apparatus of the invention are relatively simple, give rise to reduced difficulties in regulation or control, and require minimum power for compression of the gaseous fuel.

The invention will now be further described in terms of an exemplary embodiment by reference to the accompanying drawings in which the single figure of drawing is a diagrammatic representation of one form of apparatus suitable for carrying out the invention.

The drawing shows only so much of the diesel power plant as is necessary for an understanding of the invention. The diesel engine itself has been omitted from the drawing as unnecessary.

In the drawing reference character 1 denotes a container having a heat insulating layer 2 and in which there is provided a quantity 3 of liquefied natural gas. A pipe (hereinafter called a "line") 4 serves to fill the container and to permit emptying thereof. A tanker vessel will be provided with a large number of such containers, a single one being shown for the sake of simplicity. The container 1 and the other similar containers are connected at the upper part thereof to a gas line 5 into which there passes the gas developed within the container by evaporation of the liquefied gas therein. A heat exchanger 6 is provided in the line 5 for heating the gas. Additionally, the line 5 is provided with an excess pressure or safety valve 7 through which, upon the development of a pressure above the safe limit, a portion of the gas will escape to the atmosphere via a venting line 8. A compressor 12 is connected to the line 5 via a branch line 10 having a throttling element 11 therein. The compressor may be of the plural stage centrifugal type. It is driven by an electric motor 13. The power line 14 of the motor has inserted therein switches 15 which can be operated by a controller 16. The controller 16 is subjected to the pressure in the container 1 by means of a line 17, which may similarly connect with the other containers not shown. The controller 16 additionally operates the throttling device 11, by means of a servo device not shown.

A line 18 leads from the high pressure end of the compressor 12 to the valves, not shown, in the gas injection conduits leading to the combustion cylinders of the diesel engine. The line 18 includes a shut-off valve 20 which makes it possible to close off the line 18, as for example when the diesel engine is shut down. Additionally, a control line 21 is connected to the line 18, the line 21 leading to a pressure responsive device 22. In the line 21 there may be provided a pressure reducing device 23 which, according to its variable adjustment, delivers to the device 22 any desired fraction of the pressure existing in line 18. In the drawing, the pressure reducing device 23 is shown with a scale indicating the possibility of adjusting the fraction of the pressure in line 18 which is presented via line 21 to device 22. For the zero position of this scale, the connection from line 21 to device 22 is shut off, whereas at the position ten on this scale the entire pressure in line 18 is delivered to the device 22.

The pressure responsive device 22 may include a bellows 24 to which is applied the gas pressure of line 18 as modified, if at all, by operation of the pressure reducer 23. In normal operation, the entire pressure of the line 18 is applied to the interior of bellows 24 through line 21.

The bellows 24 is subjected to the action of a spring 25 which exerts a compressive force on the bellows. The bellows imposes on a stem 26 a motion so that its position corresponds to the gas pressure existing within that bellows. The stem 26 is provided with adjusting nuts 27. Upon the motion of the free end of the bellows to the left in the drawing, the stem 26 will come to bear against an adjusting rod 28 of a metering pump 30 for liquid fuel. The maximum stroke of the stem 26 and hence the motion it can impose on rod 28 is limited by engagement of the nuts 27 against a shoulder surface 29 on the pump 30. The stroke of stem 26 is therefore adjustable by adjustment, through adjustment of nuts 27, of the spacing S between the end of the outer one of the nuts and the end of the stem 26.

The fuel pump 30 is driven in known fashion from a shaft 31 and supplies liquid fuel from a line 32 through lines 33 to the individual cylinders of the diesel engine. The rod 28 is axially movable in known fashion and controls, according to its position, the amount of liquid fuel passing for injection through the lines 33. The axial position of rod 28 is illustrated in the drawing by means of a pointer attached to the rod, the pointer moving over a scale on which the zero indication represents a stopped condition for the engine. Position 1 on the scale represents the amount of liquid fuel necessary for ignition when the engine is being fired with gas fuel, and the scale position 10 represents operation at full load with liquid fuel. Adjustment of the amount of liquid fuel employed for ignition on gas firing is made by means of the nuts 27 through variation therewith of the spacing S.

The rod 28 is connected through a lever 34 with an adjusting rod 35 of a stroke determining pump 36 which may be similar to the pump 30. The pump 36 operates hydraulically, via its output lines 39 on the gas inlet valves (not shown) which control admission of fuel gas to the combustion cylinders of the engine. The pump 36 is driven at a shaft 37 which is suitably coupled to the crankshaft of the diesel engine in the same manner as is the shaft 31 of pump 30. The pump 36 receives hydraulic fluid, such as lubricating oil or the liquid fuel itself, at a line 38, and by means of this fluid the pump 36 controls via hydraulic lines 39 the open time or the lift of the diesel engine gas inlet valves, or both. Control of the amount of fluid sent through the lines 39 at each operating cycle of the pump 36, and control thereby of the diesel engine gas inlet valves, is effected by adjustment of the position of control rod 35, similarly as for pump 30 and control rod 28. For the pump 36, the zero position of its pointer opposite the scale (left-hand position of rod 35 in the drawing) represents zero supply of gaseous fuel to the diesel engine whereas the scale position 10 represents maximum opening of the gas inlet valves. The adjusting rod 35 is biased to the left, in the drawing, by means of a spring 40, i.e. in the sense of reduced gas firing. The motion of the adjustment rod 35 in this direction is limited by engagement of a stop 48 on rod 35 against the housing of pump 36.

The two-armed lever 34 is coupled by means of a lever 41 and a link 42 with the output lever 43 of a speed governor 44 whose setting lever 45 is connected by means of a link 46 with a speed control 47 at the control position of the engine. The governor 44 is coupled to the diesel engine at shaft 44'.

By adjustment of the lever 47, the governor 44 and lever arrangement 41, 42 set up the power output to be delivered by the engine. Clockwise rotation of lever 41 in the drawing represents shift to lower power output, and vice versa. Links 28' and 35' hinged to the lever 34 and to the rods 28 and 35 respectively allow for the arcuate motion of the lever 34 with such rotation of lever 41.

Along with the adjustment of desired engine output through rotation of lever 41 by operation of control 47 and governor 44, the two-armed lever 34 makes possible a supplementary and differential adjustment of the two pumps 30 and 36. By adjustment of the lever 41, the combined rate of gas and liquid fuel firing is determined. On the other hand, by operation of the lever 34, the more liquid fuel injected, i.e. the farther rod 28 moves to the right, the less will be the quantity of gas consumed, i.e. the farther to the left will be the control rod 35.

For gas pressures at or below a specified level, the spring 25 compresses the bellows 24 sufficiently so that spring 40 may move rod 35 to its limiting left-hand position, the stem 26 offering no resistance to such motion. Under these conditions, the engine is fired exclusively with oil.

When however the gas pressure in the control line 21 increases above the lower threshold or minimum level defined in the next preceding paragraph, the stem 26 and with it the metering rod 28 will be shifted to the left and in this way the quantity of liquid fuel injected will be reduced. At the same time a correspondingly greater quantity of gaseous fuel will be fed to the engine for combustion, by the consequent shift of rod 35 to the right imposed on it by rotation of rod 34 about its pivot point 34' to lever 41.

According to the invention, the pressure in the line 21 constitutes a measure of the rate of evaporation of the gas in the container 1. By operation of the controller 16, changes of pressure in container 1 will vary the gas pressure upstream of the compressor 12 and hence the pressure in the line 18.

When the apparatus thus far described gas evolves in the container 1 faster than it can be consumed by the engine, the pressure in the container will rise to such a point that the escape valve 7 will open so that the excess gas will be released to the atmosphere.

If on the other hand, by reason of excess gas consumption by the engine, the gas pressure in the container 1 falls below the minimum permissible value, the controller 16 will close the throttling device 11 completely so that the engine will be fueled exclusively with liquid fuel. Under normal circumstances however, the controller 16 will so regulate the setting of the throttling element 11 that the quantity of gas withdrawn in the engine will exactly correspond to the rate at which gas is evolved and the pressure in container 1 will be held to a level between the permissible extremes therefor. Correspondingly, by means of the invention, the fraction of the required energy input to the diesel engine beyond that provided by the gas so evaporating will be supplied by liquid fuel except in cases when the quantity of gas evolved is more than sufficient for the continuous operation of the engine or exceeds the energy input requirement thereto.

The method of the invention and the apparatus thereof thus make it possible to effect a continuous combined feed of the engine with gas and with liquid fuel without sudden changes from one fuel to the other. The invention employs for this purpose a single pressure regulator operating on the flow of gas to the engine, namely the regulator 16. In consequence, by reason of the simplicity of the control, disturbances or variations incident upon the combination or coaction of plural control devices are avoided. By reason of the fact that the compressor 12 operates against a delivery pressure determined simply by the rate of evolution of the gas, less energy is necessary for its operation than in the customary arrangement employing throttling control on the high pressure side. The consumption of energy at the compressor can be still further reduced by driving the compressor by means of a variable speed motor 13, the rate of rotation of the motor being varied in accordance with the rate of evolution of the gas, i.e. in accordance with variation in the pressure in the supply line 5. In this way, it is possible to keep the compressor in the optimum range of operating conditions and to minimize throttling losses.

As indicated, the pressure reducing device 23 is in normal operation so adjusted that the entire pressure of the line 18 is operative on the pressure responsive device 22 and on the bellows element 24 thereof. For another adjustment of the device 23 only a portion of the quantity of gas instantaneously evolved is used and the rest is either vented to the air or employed for some other purpose. This can be advantageous if, for eaxmple, the gas gives rise to knocking or "pinging" in the engine, the quantity of gas employed being then necessarily reduced accordingly. Of course, the directly operating control device 22 can be replaced by an indirectly operating servo-mechanism.

While the invention has been described herein in terms of a presently preferred embodiment, the invention itself is not limited thereto, but rather comprehends all modifications on and departures therefrom falling within the spirit and scope of the appended claims.

I claim:

1. Fuel supply and control apparatus for an internal combustion engine comprising separate liquid and gaseous fuel suppy lines, separate liquid and gaseous fuel metering devices for controlling delivery to the engine of the fuel in said liquid and gaseous fuel supply lines respectively, a separate control element in each of said devices movable in one sense for increase in fuel setting and in the opposite sense for decrease in fuel setting, a governor, an output signal member coupled to the governor, linkage means coupling said elements to each other and to said output signal member for motion of both of said elements in the same sense in response to motion of said output signal member and for motion of one of said elements in one sense in response to motion of the other of said elements in the opposite sense, resilient means stressing the control element of the gaseous fuel metering device toward minimum gaseous fuel setting, and means responsive to pressure in said gaseous fuel supply line to establish for the control element of said liquid fuel metering device a position of maximum availability liquid fuel setting which varies inversely with pressure in said gaseous fuel supply line.

References Cited

UNITED STATES PATENTS

| | | | |
|---|---|---|---|
| 2,602,289 | 7/1952 | Anxionnaz et al. | 60—39.02 |
| 2,612,145 | 9/1952 | Stevens et al. | 123—27 |
| 2,690,167 | 9/1954 | Moulton | 123—121 |
| 2,708,916 | 5/1955 | Davids | 123—27 |
| 2,734,490 | 2/1956 | Moulton | 123—27 |
| 2,767,691 | 10/1956 | Mengelkamp et al. | 123—1 |
| 2,928,382 | 3/1960 | Hug | 123—27 |
| 2,954,760 | 10/1960 | Hug | 123—27 |
| 3,016,886 | 1/1962 | Benz et al. | 123—27 |

LAURENCE M. GOODRIDGE, *Primary Examiner.*